(12) United States Patent
Nakada et al.

(10) Patent No.: US 8,582,918 B2
(45) Date of Patent: Nov. 12, 2013

(54) IMAGING DEVICE, IMAGE COMPOSITION AND DISPLAY DEVICE, AND IMAGE COMPOSITION METHOD

(75) Inventors: Naohisa Nakada, Hachioji (JP); Akira Tani, Sagamihara (JP); Yuiko Uemura, Hachioji (JP); Masashi Takahashi, Hachioji (JP); Osamu Nonaka, Sagamihara (JP)

(73) Assignee: Olympus Imaging Corp., Tokyo (JP)

( * ) Notice: Subject to any disclaimer, the term of this patent is extended or adjusted under 35 U.S.C. 154(b) by 891 days.

(21) Appl. No.: 12/700,587

(22) Filed: Feb. 4, 2010

(65) Prior Publication Data

US 2010/0195912 A1    Aug. 5, 2010

(30) Foreign Application Priority Data

Feb. 5, 2009   (JP) ................. 2009-024471

(51) Int. Cl.
*G06K 9/20* (2006.01)
*G06K 9/00* (2006.01)

(52) U.S. Cl.
USPC .......... 382/282; 382/118; 382/173; 345/629; 345/632; 345/633; 348/584; 348/586

(58) Field of Classification Search
USPC .......... 382/282, 118, 173; 345/629, 632, 633; 348/584, 586
See application file for complete search history.

(56) References Cited

U.S. PATENT DOCUMENTS

| | | | | |
|---|---|---|---|---|
| 5,594,850 A | * | 1/1997 | Noyama et al. | 345/632 |
| 5,937,081 A | * | 8/1999 | O'Brill et al. | 382/111 |
| 6,661,906 B1 | * | 12/2003 | Kawade et al. | 382/118 |
| 6,847,383 B2 | * | 1/2005 | Agnew | 345/660 |
| 7,274,806 B2 | * | 9/2007 | Fukuma et al. | 382/118 |
| 8,099,462 B2 | * | 1/2012 | Sheng et al. | 709/204 |
| 2008/0094364 A1 | * | 4/2008 | Moroto et al. | 345/168 |

FOREIGN PATENT DOCUMENTS

| | | |
|---|---|---|
| JP | 2004-246635 | 9/2004 |
| JP | 2007-157176 | 6/2007 |

OTHER PUBLICATIONS

Ugur, Basar. Parametric Human Body Modeling for Virtual Dressing. MA thesis. Bogazici University, 2008. Web. <www.cmpe.boun.edu.tr/medialab/bugurmsthesis.pdf>.*

* cited by examiner

*Primary Examiner* — Michael A Newman

(74) *Attorney, Agent, or Firm* — John C. Pokotylo; Straub & Pokotylo

(57) ABSTRACT

An imaging device of the present invention comprises an imaging section for forming a subject image and outputting image data, a face detection section for detecting a person's face based on the image data, a decoration image selection section for selecting a decoration image from a plurality of decoration image data, in accordance with a face detected by the face detection section, and a first combining section for combining the selected decoration image and the face image. Also, an image composition and display device of the present invention comprises a storage section for storing image data, a decoration image selection section for selecting a decoration image from a plurality of decoration image data, in accordance with a face detected from image data, and a first combining section for combining the selected decoration image and the face image.

6 Claims, 15 Drawing Sheets

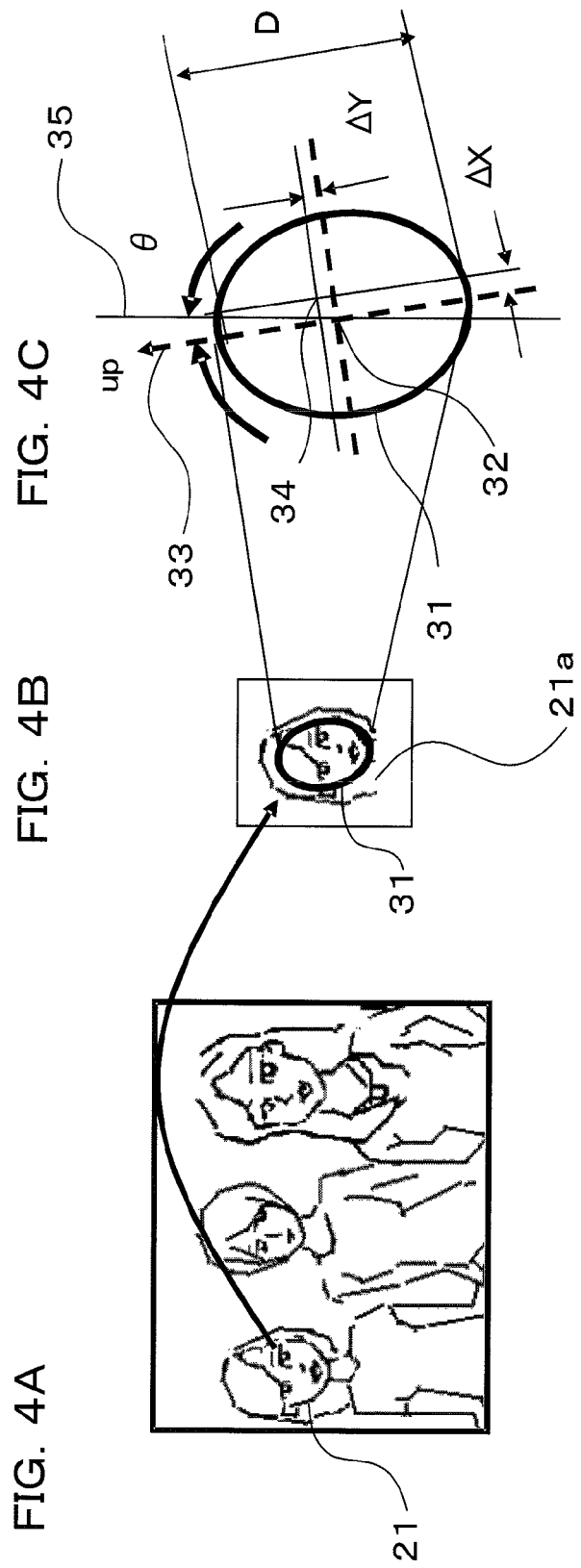

FIG. 8A

| classification result | | image 1 | image 2 | image 3 | image 4 | image 5 |
|---|---|---|---|---|---|---|
| | | snapshot | snapshot | scenery | snapshot | scenery |
| number of face | | 2 | 3 | 0 | 1 | 0 |
| location of face, and orientation and size | A1 | | | | | |
| | A2 | | | | | |
| | A3 | | | | | |
| | A4 | right 15° · D2 | left 5° · D3 | | | |
| | A5 | | forward · D3 | | forward · D1 | |
| | A6 | right 15° · D3 | down 5° · D3 | | | |
| | A7 | | | | | |
| | A8 | | | | | |
| | A9 | | | | | |
| combinable | | not combinable | not combinable | not combinable | not combinable | combinable |
| focal length | | ST | ST | T | W | ST |
| time and date, and location | | 9/15 | 9/15 | 9/15 | 9/15 | 9/15 |

FIG. 8B

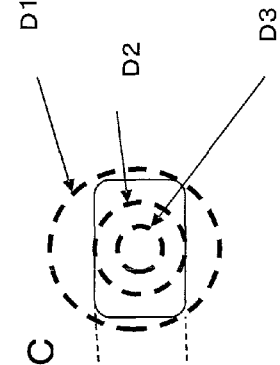

FIG. 8C

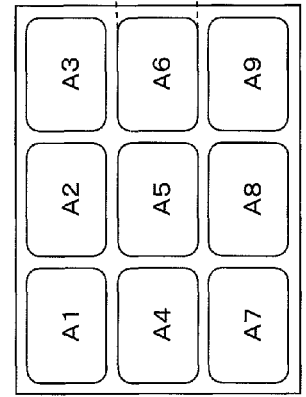

IMAGING DEVICE, IMAGE COMPOSITION AND DISPLAY DEVICE, AND IMAGE COMPOSITION METHOD

Benefit is claimed, under 35 U.S.C. §119, to the filing date of prior Japanese Patent Application No. 2009-024471 filed on Feb. 5, 2009. This application is expressly incorporated herein by reference. The scope of the present invention is not limited to any requirements of the specific embodiments described in the application.

BACKGROUND OF THE INVENTION

1. Field of the Invention

The present invention relates to an imaging device, and image composition and display device, and an image composition method, and in detail relates to an image sensor that can combine a human portion, within an image of a person, with a background image, an image composition and display device, and an image composition method.

2. Description of the Related Art

In recent years, imaging devices have become digital, and various image processing, such as extracting a face portion from an image of a person, and combining that face portion with a background image, has become easy. There has also been an increase in opportunities to see such composite images, and an increase in users who think they would like to create composite images they have taken themselves.

For example, Japanese Patent Laid-open No. 2004-246635 (laid-open Sep. 2, 2004) discloses a human image processing method for forming a composite image of a human image and a background image that appears natural, even if extraction of the image from an original image was not carried out accurately. With this human image processing method, it is determined whether or not a boundary between the person extracted from the original image and the background is accurate, and if it is judged to be not accurate, portions of the boundary that are inaccurate are concealed.

SUMMARY OF THE INVENTION

An object of the present invention is to provide an imaging device that can form an image that has a person's clothes etc. changed, with a simple structure, an image composition display device, and an image composition display method.

An imaging device of the present invention comprises: an imaging section for forming a subject image and outputting image data, a face detection section for detecting a person's face based on the image data, a decoration image selection section for selecting a decoration image from a plurality of decoration image data, in accordance with a face detected by the face detection section, and a first combining section for combining the selected decoration image and the face image.

An imaging device of the present invention comprises: an imaging section for forming a subject image and outputting image data, a characteristic detection section for detecting a characteristic of a person based on the image data and outputting characteristic information, a communication section for transmitting characteristic information detected by the feature detection section to an external server, and receiving information relating to an image in which clothing has been changed by the external server, and a storage section for storing an image in which the changed clothing is put on the person, based on the received information.

An image composition device of the present invention comprises: a storage section for storing image data, a decoration image selection section for selecting a decoration image from a plurality of decoration image data, in accordance with a face detected from image data, and a first combining section for combining the selected decoration image and the face image.

An image composition method of the present invention comprises the steps of: detecting a face from a human image within stored image data, selecting a decoration image from a plurality of decoration image data in accordance with the detected face, and carrying out first image combining for the selected decoration image and the image of the face portion.

BRIEF DESCRIPTION OF THE DRAWINGS

FIG. 4A to FIG. 4C are drawings for explaining how to detect inclination of a face, with the camera of the first embodiment of the present invention.

FIG. 8A to FIG. 8C are drawings for explaining image information used when carrying out image classification, in the camera of the first embodiment of the present invention.

DETAILED DESCRIPTION OF THE PREFERRED EMBODIMENTS

Figure 1:
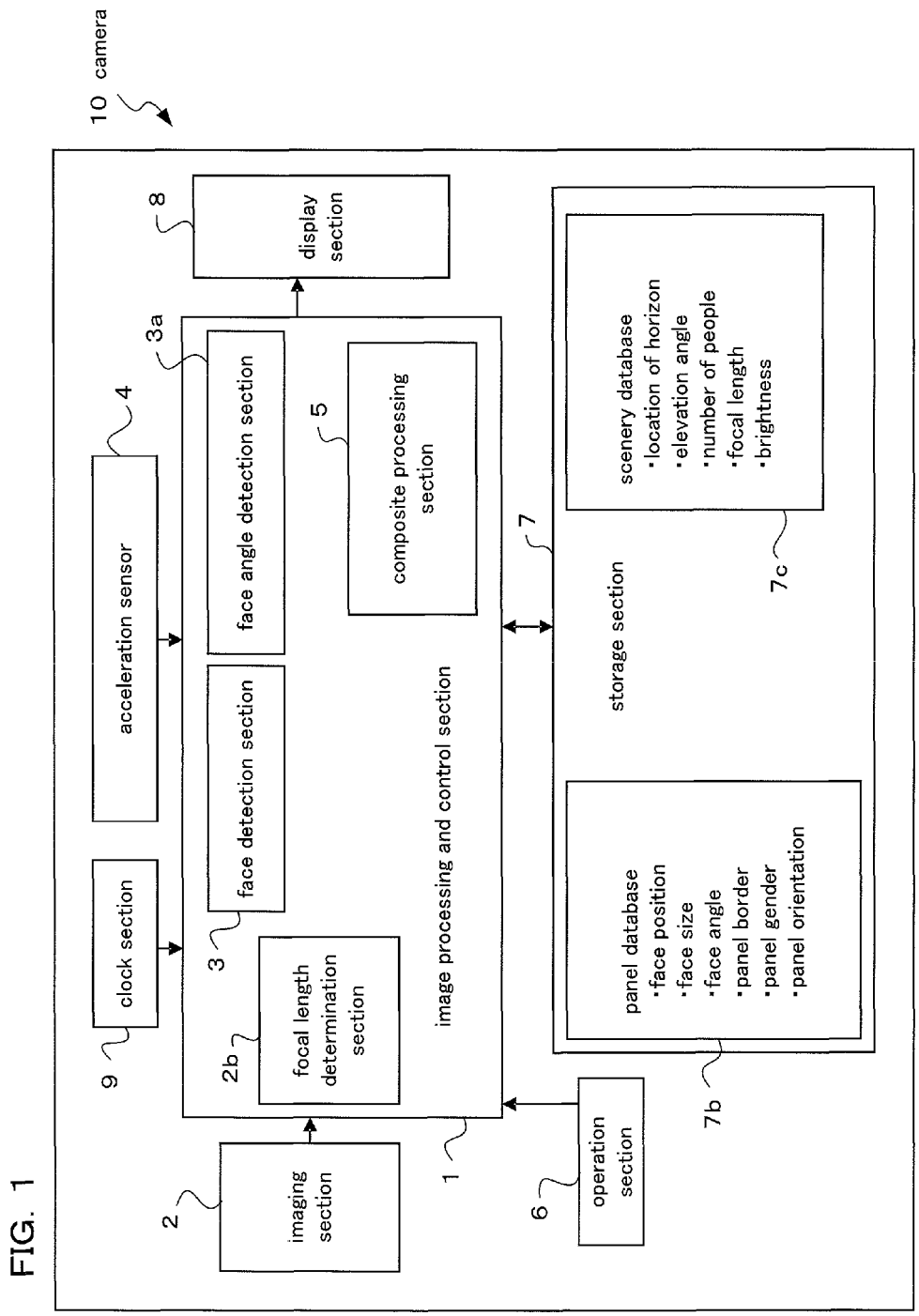
FIG. 1 is a block diagram showing electrical circuits of a camera of a first embodiment of the present invention.

A preferred embodiment using a digital camera to which the present invention has been applied will be described in the following in accordance with the drawings. FIG. 1 is a block diagram showing electrical circuits of a digital camera 10 of a first embodiment of the present invention. The camera 10 is a digital camera, and comprises an image processing and control section 1, imaging section 2, acceleration sensor 4, operation section 6, storage section 7, display section 8, and clock section 9 etc.

The imaging section 2 includes an exposure control portion such as a photographing lens having a zoom function and a shutter, an image sensor, and image sensor drive and readout circuits, etc., and converts a subject image that has been formed by the photographing lens to image data using the image sensor.

The image processing and control section 1 controls all sequences of the camera 10, in accordance with stored programs. Various image processing, such as acquiring image signals output from the imaging section 2, thinning processing, edge enhancement, color correction, image compression etc. are also carried out, and image processing such as live view display, storage to the storage section 7, playback processing, and panel display, which will be described later, is carried out. A focal length determination section 2b, face detection section 3, face angle detection section 3a and composite processing section 5 are included within the image processing and control section 1.

The focal length determination section 2b determines focal length of a zoom lens of the imaging section 2, and outputs this focal length information. The face detection section 3 determines whether or not a face portion is included within an image based on image data acquired by the imaging section 2. Also, in the event that a face portion is included, the position and size etc. of the face are detected. The imaging section 2 can also perform focusing so that face portion detected by the face detection section 3 is in focus. The face angle detection section 3a detects, for the face that has been detected by the face detection section 3, direction of orientation (angle) of the face, and size of the face, etc.

The composite processing section 5 performs image composition of a panel image that is stored in a panel database 7b within the storage section 7, which will be described later, and a background image that is stored in a background database, based on a face portion detected by the face detection section 3.

The acceleration sensor 4 detects acceleration applied to the camera 10, and measures an elevation angle at the time of taking a picture with the camera 10. As long as it is capable of measuring an angle of elevation, it is also possible to use another sensor besides an acceleration sensor, such as a gyro, angular velocity sensor etc.

The operation section 6 contains various operation members, such as a release button, power switch, playback mode setting button, playback image next/previous button, thumbnail button, panel display button, scenery change button, etc., and determines operating states of these operation members and sends determination results to the image processing and control section 1. The image processing and control section 1 carries out control for shooting and playback in a specified sequence, in accordance with the operating states of the operation members.

The storage section 7 stores image data that has been acquired by the imaging section 2 when shooting is instructed by a release button, and that has been subjected to image processing by the image processing and control section 1. Also, when storing image data, it is associated with information such as image classification information and face features etc., and this associated information is recorded. This associated information also includes time and data information for when a picture was taken, acquired by the clock section 9 which will be described later, focal length information determined by the focal length determination section 2b, and elevation angle information for the time the picture was taken detected by the acceleration sensor.

A panel database 7b and a scenery database 7c are stored within the storage section 7. The panel database 7b stores panel images (like painted display boards) from which face portions have been removed. The panel images show various characters such as a "princess", "military commander", "ghost", and include the equivalent of painted display boards for commemorative photos at sight seeing areas etc. The panel images can also cover up a person's body, and it is possible to insert the face portion of a person in a taken image into a face portion. Since in a panel image an outline portion is already known, when combining with a background image such as a scenery image it is not necessary to cut out along the complicated outline of a human image.

Figure 2:
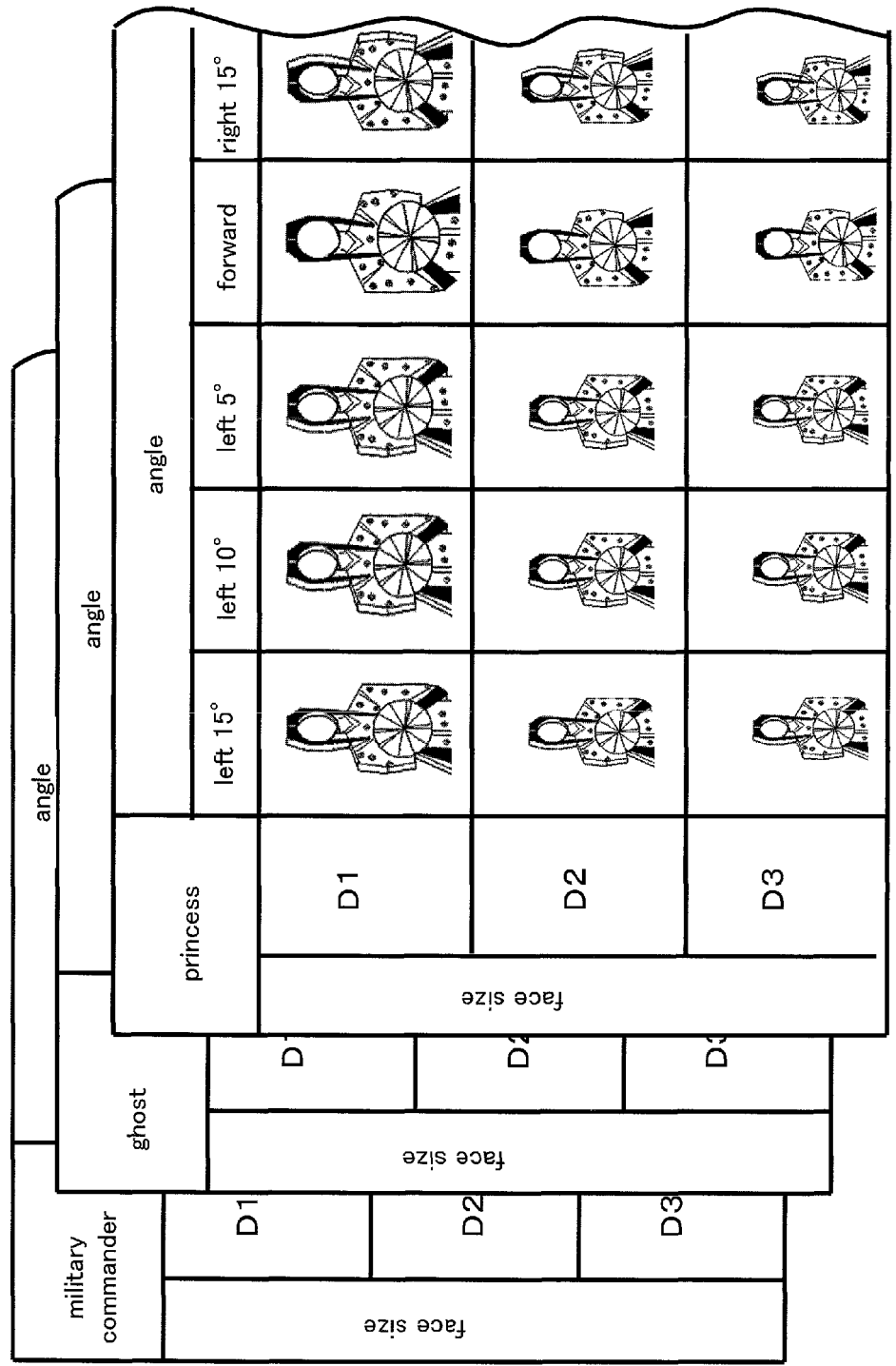
FIG. 2 is a drawing showing an example of a panel image stored in a panel database, for the camera of the first embodiment of the present invention.

Examples of panel images stored in the panel database 7b are shown in FIG. 2. In this database of panel images, position of a face portion, size of a face (in the example shown in FIG. 2 sizes are D1-D3), and information relating to angle of the face (in the example shown in FIG. 2 left 15°-right 5°), are stored separately for categories (in the example shown in FIG. 2 "princess", "ghost", "military commander"), together with panel images. Information relating to a boundary of a panel image, information relating to gender of a panel image (male or female), and information relating to direction in which a panel image is facing, are also stored.

A plurality of scenery images of famous places in Japan and throughout the world, and scenery images that the user has taken, are stored in the scenery database 7c. The scenery images are used when combining with a panel image that has had a face portion of a person inserted. The scenery database 7c stores elevation angle information, and sky/horizon position correlated to individual scenery images. In this embodiment, elevation angle information at the time of shooting is detected by the acceleration sensor 4, and this elevation angle information and image data are stored in the storage section 7 in association with each other, but there are also situations where there is no elevation angle information within scenery image data stored in the scenery database 7c. Therefore, sky/horizon position information is also stored in cases where there is no elevation angle information, so that it is possible to select an appropriate scenery image. Also, information such as information regarding the number of people in the image, focal length information at the time of shooting, and brightness information at the time of shooting are additionally stored in the scenery database 7c.

The display section 8 displays image data of a panel image that has been combined in the composite processing section 5. Besides combined images, there is also live view before shooting, and ordinary playback display of already taken images etc. The display section 8 also displays a determination result as to whether or not there is a panel image for carrying out panel display at the time of live view display. The clock section 9 has a calendar function and a clock function, and outputs shooting date and time information at the time of shooting, as previously described. This shooting location information and shooting date information is used at the time of image processing and image search.

Figure 3C:
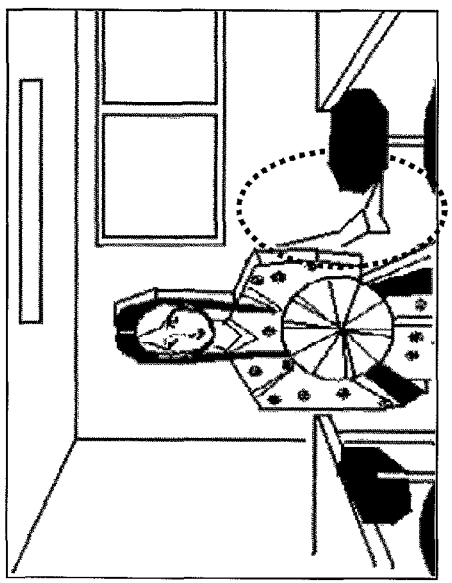
FIG. 3A to FIG. 3F are drawings for explaining generation of a background composite image, in the camera of the first embodiment of the present invention, where, after a face portion has been extracted from a human image and combined with a panel image, it is then combined with a background image.
Figure 3B:
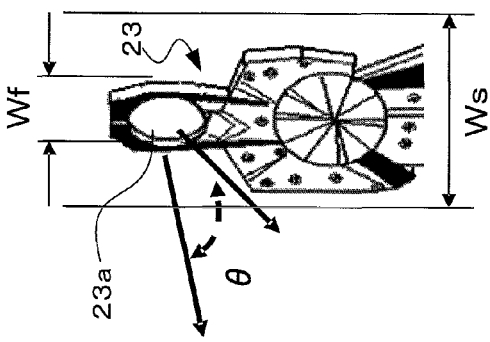
Figure 3A:
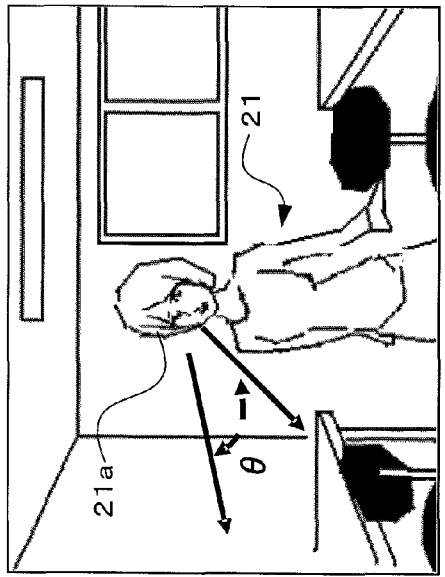

Next the manner of image combining in this embodiment will be described using FIG. 3A-FIG. 3F. FIG. 3A is an image of a person 21 taken by the user using the camera 10. This taken image contains a background as well as the person 21, and the face 21a of the person 21 is facing towards the left by an angle θ with respect to the camera 10. The way in which this angle of the face 21a of the person 21 is obtained will be described later using FIG. 4A-FIG. 4C.

If the taken image is chosen, a panel image 23 appropriate to the face 21a of the person 21 in that taken image is next selected. When selecting the panel image, a panel image that substantially matches with the position, size Wf and orientation θ etc. of the face 21a of the person 21 stored in association with image data of the taken image is searched for in the panel database 7b. If the width Ws of the panel image is smaller than the width of the person 21, part of the person 21 will stick out, as shown in FIG. 3C (in the example of FIG. 3C a hand is sticking out). However, as shown in FIG. 3D, if a panel composite image having the portion of the face 21a of the person 21 inlaid in the portion of the face 23a of the panel image 23 is generated, the above described sticking out section is eliminated.

Figure 3F:
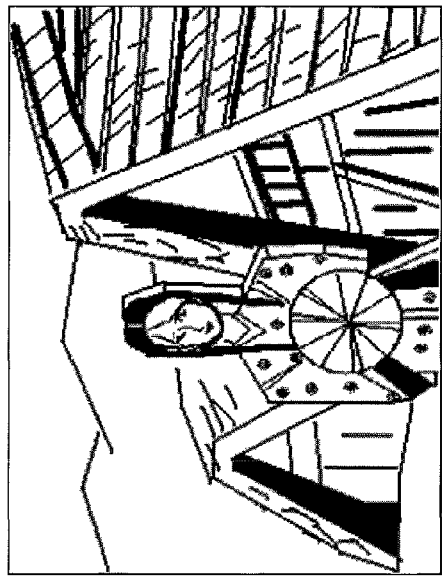
Figure 3E:
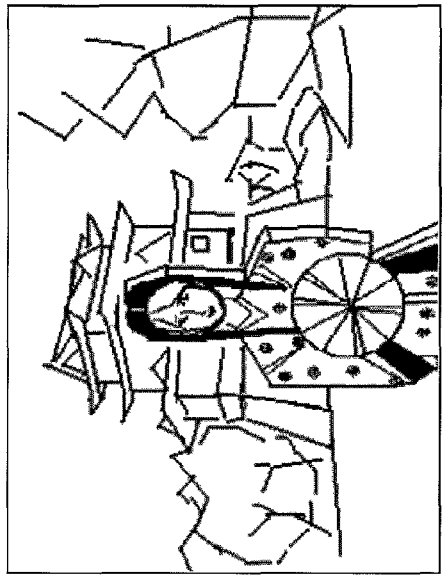
Figure 3D:
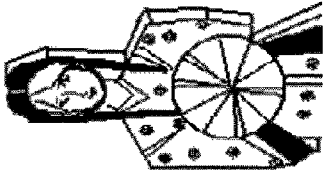

If a panel composite image having the face 21a of the person 21 inlaid is possible, then next, as shown in FIG. 3E and FIG. 3F, a background image is combined with the panel composite image to generate a background composite image. At the time of combining with the background image, outline information indicating the outline of the panel composite image is stored in association with the panel image 23, and so it is possible to easily perform image combining.

Next, the manner in which the angle in which the face 21a of the person 21 is facing is obtained will be described using FIG. 4A-FIG. 4C. In the case where an image containing a person 21, as shown in FIG. 4A, has been acquired, the face 21a of the person 21 is extracted from within that image, as shown in FIG. 4B. Then, a face outline 31 which is an elliptical approximation is extracted from the outline information of the face of the person 21, as shown in FIG. 4B and FIG. 4C. An intersection of the long axis and short axis of this ellipse is obtained, and this intersection is made the face outline center 32. Also, an intersection of shadows of the face 21a of the person 21, for example, an intersection of a line joining the two eyes and a line running through the nose, is made a face shading center 34. Offset amounts ΔX and ΔY of shadows corresponding to the eyes and nose are obtained from an offset between the respective intersections. The size D of the face is also obtained from the longitudinal length passing through the shadow center 34.

An inclination angle θ between a screen vertical line 35 and a face shading vertical line 33 passing vertically through the face shadow center 34 (shown as a line parallel to a line passing through the center 34 in FIG. 4C) is also obtained. These obtained values ΔX, ΔY, D and θ represent features of the face of the person 21, and so these feature values are stored in association with the image of FIG. 4A, and if image composition is carried out by searching for a panel image 23 that matches the feature values, a natural composition is obtained.

Figure 5:
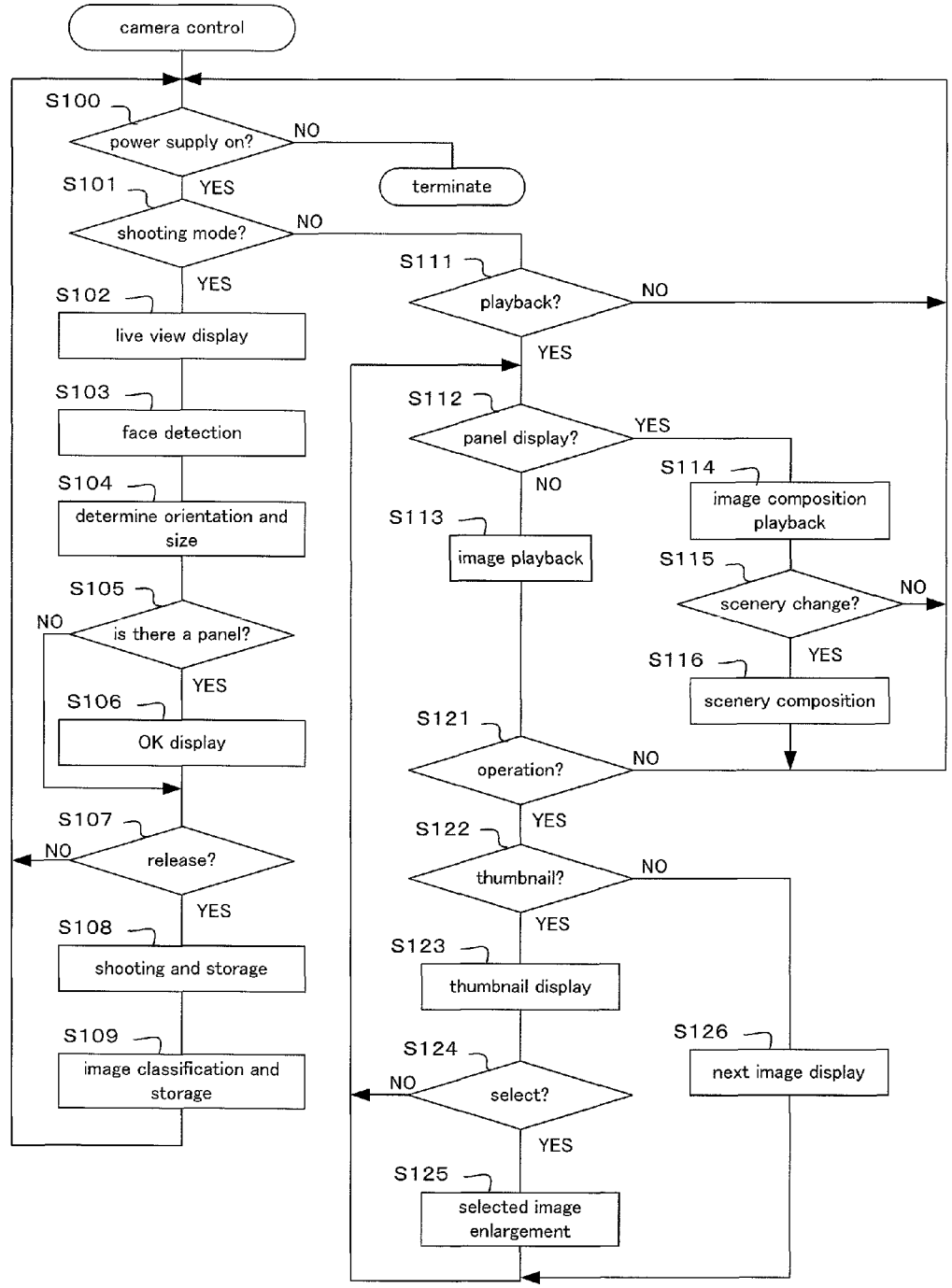
FIG. 5 is a flowchart showing camera control operation for the camera of the first embodiment of the present invention.

Next, camera control operations of this embodiment will be described using the flowchart shown in FIG. 5. If the processing flow for camera control is entered, it is first determined whether or not a power supply is on (S100). In this step, whether or not a power switch of an operation section 6 of the camera 10 is on is determined, and if the power switch is off the processing flow for camera control is terminated. Even if the processing flow for camera control is terminated, the state of the power switch is detected, and once the power switch becomes on operations from step S100 commence.

If the result of determination in step S100 is that the power switch is on, it is next determined whether or not the camera is in shooting mode (S101). If the result of this determination is that the camera is in shooting mode, then live view display is carried out (S102). Here, a subject image is subjected to live view display on the display section 8 at a frame rate of 30 frames per second, based on image data acquired by the imaging section 2. Based on the live view display the user can decide on which aspect to take the picture in, determine a photo opportunity and carry out the release operation.

If live view display is commenced, face detection is carried out next (S103). Here, determination as to whether or not a face is contained is carried out by the face detection section 3 based on image data from the imaging section 2. The orientation and size are then determined (S104). Here, the direction in which a face is facing and the size of the face are determined by the face inclination angle detection section 3a using the method that has been described using FIG. 4A-FIG. 4C.

If determination of the direction and size of the face has been carried out in step S104, it is next determined whether or not there is a panel image (S105). Here, determination as to whether or not there is a panel image that is a substantial match in the panel database 7b is carried out using information such as the position, size and orientation of the face determined in steps S103 and 5104. If the result of this determination is that a panel image exists, OK display is performed on the display section 8 (S106).

In this way, in steps S103 to 5106 whether or not image composition for panel display is possible is notified to the photographer. By looking at this display, it is possible for the user to know if it is possible to carry out panel display, namely display of a panel composite image having a person's face inlaid in a panel image, and display of a background composite image further combined with a background image, when deciding on composition. If there is no need to display availability of panel display beforehand, then it is possible to omit steps S105-S106.

Once OK display has been carried out in step S106, and if the result of determination in step S105 is that there is no panel image, it is then determined whether or not to carry out release (S107). Here, whether or not the release button has been operated is determined based on signals from the operation section 6. If the result of this determination is that there has been no release, processing returns to step S100. On the other hand, if the result of determination in step S107 is that there has been release, shooting and storage are carried out next (S108).

In the shooting and storage of step S108, image data acquired by the imaging section 2 is subjected to image processing by the image processing and control section 1, and this image processed image data is stored in the storage section 7. At the time of storing image data, it is stored together with shooting time and date information acquired by the clock section 9.

Once shooting and storage are carried out, image classification and storage is carried out next (S109). Here, a shot image is classified into each of shooting themes, such as snapshot, portrait, background, etc., and features such as number of faces in a shot image, and the position, size and orientation of those faces are detected, and image classification is carried out to obtain various information such as, if it is a background image, whether or not it is combinable. Once image classification is carried out, the classification results are stored. Image data is stored in step S108, but in step S109 classification results are stored in the storage section 7 in association with stored image data in a table format such as shown in FIG. 8A that will be described later. Once classification results are stored, processing returns to step S100.

If the result of determination in step S101 is not shooting mode, it is next determined whether or not the camera is in playback mode (S111). If the result of this determination is that it is not playback mode, processing returns to step S100.

On the other hand, if it is playback mode it is determined whether or not to carry out panel display (S112).

If the user wants to enjoy image playback using the panel display, the panel display button is operated, and so whether or not the panel display button has been operated is determined in this step S112. Panel display mode is a mode in which a panel composite image having a panel image 23 inserted into a face 21a of a person 21 in a taken image, or a background composite image where a background image such as a scenery image is combined with this panel composite image, is displayed, as was described using FIG. 3A-3F. If the result of determination in step S112 is not panel display mode, normal playback is carried out (S113).

Once normal playback mode is carried out, it is next determined whether or not there has been an operation (S121). Here, it is determined whether or not there has been operation of a next button or previous button for the image being playback displayed, or whether a thumbnail button for thumbnail display has been operated. If the result of this determination is that these operations have not been performed, processing returns to step S100.

On the other hand, if the result of determination in step S121 is that an operation has been performed, it is determined whether or not it was the thumbnail button that was operated (S122). If the result of this determination is that the thumbnail button has not been operated, that is, that the next or previous image button has been operated, the next image in accordance with the operation is read from the storage section 7 and displayed on the display section 8 (S126). Once the next image is displayed processing returns to step S112.

If the result of determination in step S122 is that the thumbnail button has been operated, thumbnail display is carried out (S123). Thumbnail display is a format for displaying a plurality of taken images that are stored in the storage section 7 on the display section 8 in the form of a list. If thumbnail display is carried out, it is determined whether or not an image has been selected from among the thumbnail display (S124). Since the user selects an image they want to see from among the thumbnail display using a select button, in this step it is determined whether or not the select button has been operated.

If the result of determination in step S124 is that an image has not been selected processing returns to step S112. On the other hand, if the result of determination is that an image has been selected then the selected image is display enlarged on the display section 8 (S125). Once the selected image has been displayed enlarged, processing returns to step S112.

If the result of determination in step S112 is that panel display is carried out, next image composition playback is carried out (S114). With this image composition playback, image combination of a panel image with the currently selected image is carried out. At the point in time when playback mode has just been entered, since the most recently taken image is being playback displayed, image combination of the panel image with this image is carried out. Also, if there is a switch to panel display mode after an image has been selected in steps S125 and S126, image combination is carried out with this selected image.

As described using FIG. 3A-FIG. 3F, image composition for this panel display involves first extracting a portion of a face 21a of a person 21 for the image that is being selected. A panel image 23 that substantially matches the portion of the face 21a that has been extracted is then searched for from within the panel database 7b. Here an image in which the position, size and orientation of the face etc. of the panel image 23 substantially match is searched for, but categories such as are "princess", "ghost", "military commander" etc. are randomly selected. By selecting randomly, it is possible for the user to enjoy an element of surprise with the panel displayed composite images. Naturally there is no problem in also being able to manually select categories.

If a panel image 23 is selected, then next, the face 21a of the person 21 is inlaid in the face 23a of this selected panel image 23. An outline (border) of the portion of the face 32a of the panel image 23 is stored in advance as data, and so the face 21a of the taken image is cut out like this outline, and inlaid in the face 23a of the panel image 23, thus enabling simple image processing. At this time, as shown in FIG. 3C, part of the body of the person 21 (a hand in FIG. 3) sticks out, but this portion is eliminated.

In step S114, if image composition processing is carried out, the background is still the taken image as shown in FIG. 3A and FIG. 3C, but this panel composite image is displayed on the display section 8. Next it is determined whether or not a scenery change is performed (S115). When the user wants to further change the scenery of the background portion, the scenery change button in the operation section 6 is operated, and so in this step it is determined whether or not the scenery change button has been operated.

If the result of determination in S115 is that there is no scenery change, processing returns to step S100. On the other hand, if the result of determination is that there is scenery change then scenery composition is carried out (S116). Here, combination of a panel image 23 in which the face 21a is inlaid, and a scenery image stored in the scenery database 7c is carried out, to display a composite image as shown in FIG. 3E and FIG. 3F. This scenery image subroutine will be described later using the processing flow shown in FIG. 7. Once scenery composition is carried out, processing returns to step S100.

Next the image classification and storage subroutine of step S109 will be described using the processing flow shown in FIG. 6. As well as shooting date and time information and shooting location information as shot image information, dividing into categories using the image classification subroutine shown in FIG. 6 is also useful in increasing search efficiency.

Figure 6:
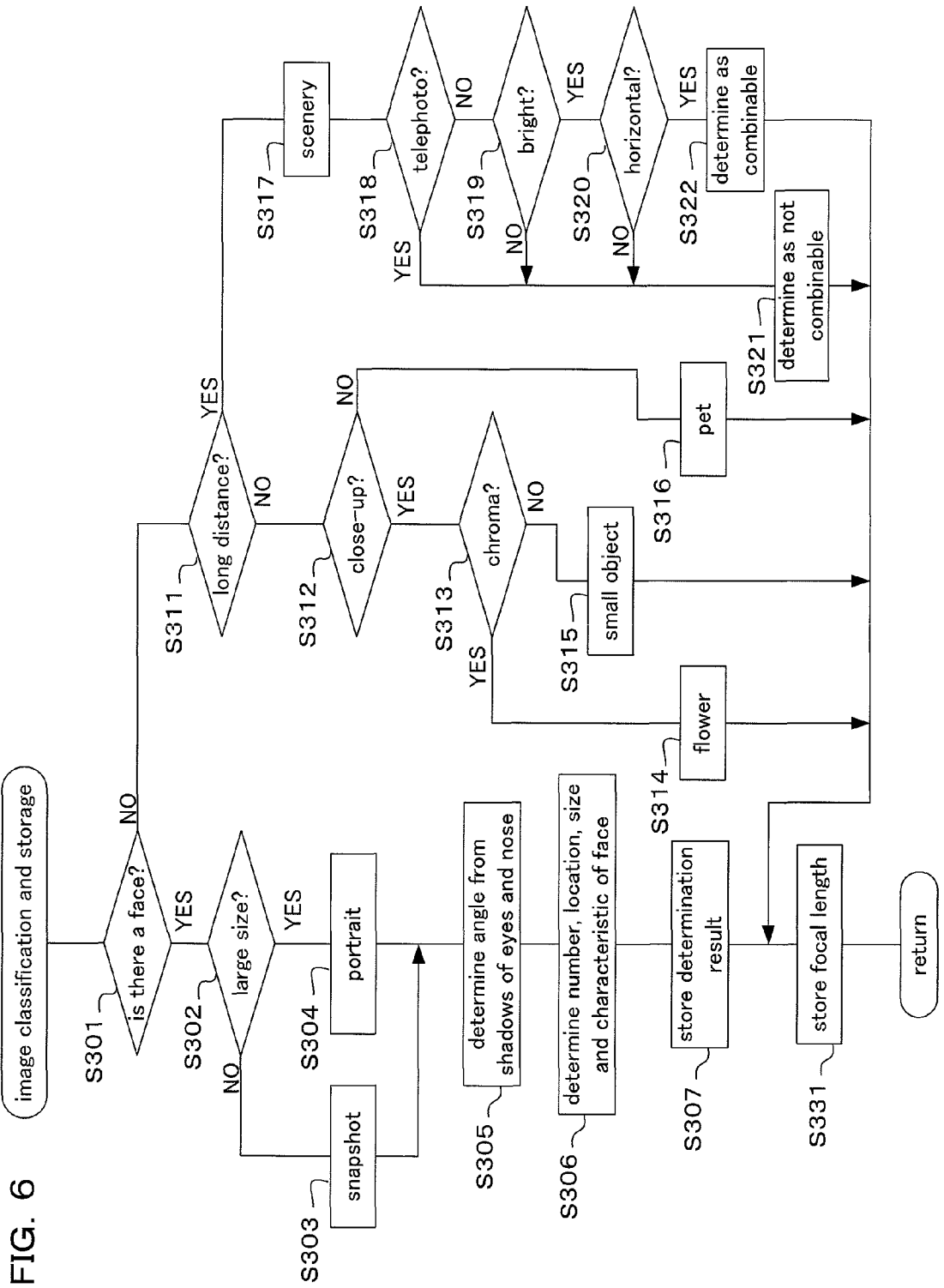
FIG. 6 is a flowchart showing image classification operation for the camera of the first embodiment of the present invention.

If the image classification subroutine shown in FIG. 6 is entered, it is first determined whether or not there is a face in the image (S301). This determination is carried out by the face detection section 3. If the result of this determination is that a face exists, it is next determined whether or not the face is large (S302). Here, it is determined whether or not the face is larger than a specified value based on face size (size D in FIG. 4) detected by the face inclination angle detection section 3a.

If the result of determination in step S302 is that the face is larger than a specified size, it is determined to be a portrait photograph, while if the face is smaller than the specified size it is determined to be a snapshot (S303). Accordingly, the determination value in S302 is made a value appropriate to carrying out this identification.

Once the identification of steps S303 and 5304 has been carried out, determination of angle is carried out from the shadows of the eyes and nose (S305). As has been described using FIG. 4A-FIG. 4C, it is possible to detect a direction θ in which the face is oriented from the shadows of the eyes and nose. Next the number of faces, and their location, size and features are detected and determined (S306). Here, the number, location and size of the faces, and facial features, are determined based on detection results from the face detection section 3 and face inclination angle detection section 3a. Next, determination results from steps S303 to 5306 are stored in association with image data (S307).

If the result of determination in step S301 is that there is no face, it is next determined whether or not it is a long distance shot (S311). This determination is carried out based on focus position at the time of focusing by the imaging section 2. If the result of determination is that it is not long distance, it is next determined whether or not it is a close up (S312). This determination is determination as to whether or not shooting is carried out in a macro region at close range, and is also based on focus position at the time of focusing in the imaging section 2. If the result of this determination is that shooting was not carried out at close range, it is determined to be a pet photograph, and assignment of classification is carried out (S316). When searching for a pet image, if search is carried out from this pet classification it is possible to find an image quickly.

If the result of determination in step S312 is that it is close range, it is determined whether or not chroma of the taken image is high (S313). This is carried out based on chroma of the image data. If the result of this determination is that chroma is high, it is determined to be a photograph of a flower, and classification assignment is carried out (S314). On the other hand, if the result of determination is that chroma is low, it is determined to be a photograph of a small object, and classification assignment is carried out (S315).

If the result of determination in step S311 is that it is long range, it is determined to be a scenery photograph, and classification assignment is carried out (S317). Next, it is determined whether or not the taken image was taken at the telephoto end (S318). Since focal length information at the time of shooting is detected by the focal length determination section 2b, in this step it is determined whether or not focal length information detected by the focal length determination section 2b is more toward a long focal length side than a specified focal length.

If the result of determination in step S318 is that the image was not shot at the telephoto end, it is next determined whether or not subject image brightness is high (S319). Here, it is determined whether or not average brightness of image data is brighter than a specified brightness. If the result of this determination is that the image is bright, it is next determined whether or not shooting was carried out horizontally (S320). Since elevation angle at the time of shooting is detected by the acceleration sensor 4, in this step it is determined whether or not it was substantially horizontal based on this detected elevation angle information. If the result of this determination is horizontal, it is determined to be combinable, and this determination result is stored as image data associative information (S322). This combinable determination is a determination that it is possible to use the image as a scenery image in a panel composite image.

If the result of determination in step S318 is towards the telephoto end, or if the result of determination in step S319 is that the image is not bright, or if the result of determination in step S320 is that the image was not shot horizontally, it is determined to be not combinable, and this determination is stored as associative information of the image data (S321). This not combinable determination is a determination that it is not possible to use the image as a scenery image in a panel composite image. Specifically, this is because in the case of performing composition with a scenery image as a background image when carrying out panel display, an image taken at the telephoto end, an image in a dark environment, or an image that was taken looking upwards would become unnatural when combined with the panel image 23, and so combination should not be carried out with these types of scenery images.

Once processing in steps S307, S314 to S316, S321 and S322 is completed, the focal length is then stored (S331). The focal length is determined by the focal length determination section 2b, and in this step is stored as associative information of the image data. Once storage of focal length is carried out, the original processing flow is returned to.

In this way, with the processing flow for image classification and storage, whether or not there is a face in the image is determined, and if there is face information related to that person is detected, and the image classified as either a snapshot or a portrait, and stored. Also, if there is not a face in the image, it is classified as a flower, pet or scenery, and stored. Further, in the case of being classified as scenery, it is determined whether or not it would be combinable or not combinable at the time of panel display, and stored.

Next, one example of the classification in the image classification and storage processing flow, and information stored in the storage section 7 as associative information of the image data, is shown in FIG. 8A. Also, FIG. 8B shows an example of screen partitioning, and in this embodiment the screen is divided into nine regions A1 to A9. In each of the regions A1 to A9 the size of a face is divided into three levels of D1 to D3 as shown in FIG. 8C.

In FIG. 8A, an image 1 is a snapshot photo, and has two faces, reflecting a person in region A4 being oriented facing 15° to the right and having a face size of D2, and a person in region A6 orientated facing 15° to the right and having a face size of D3. Also, the image 1 is not combinable, the focal length is the focal length of a standard (ST) lens, and the shooting data is September 15th. Information associated with the image is also stored for image 2 to image 5, as shown in FIG. 8A. With the example shown in FIG. 8A, image 5 is the only one that is combinable as a scenery image.

If this type of image classification is carried out, then at the time of playback display with a panel image it is possible to carry out searching for panel images that substantially match a person 21, or for scenery images that can also be combined at the time of scenery composition, quickly and efficiently. For example, in the case of searching for scenery images, images that have been classified as not combinable in step S321 can be removed as search objects, and it is possible to make the search fast and efficient.

Figure 7:
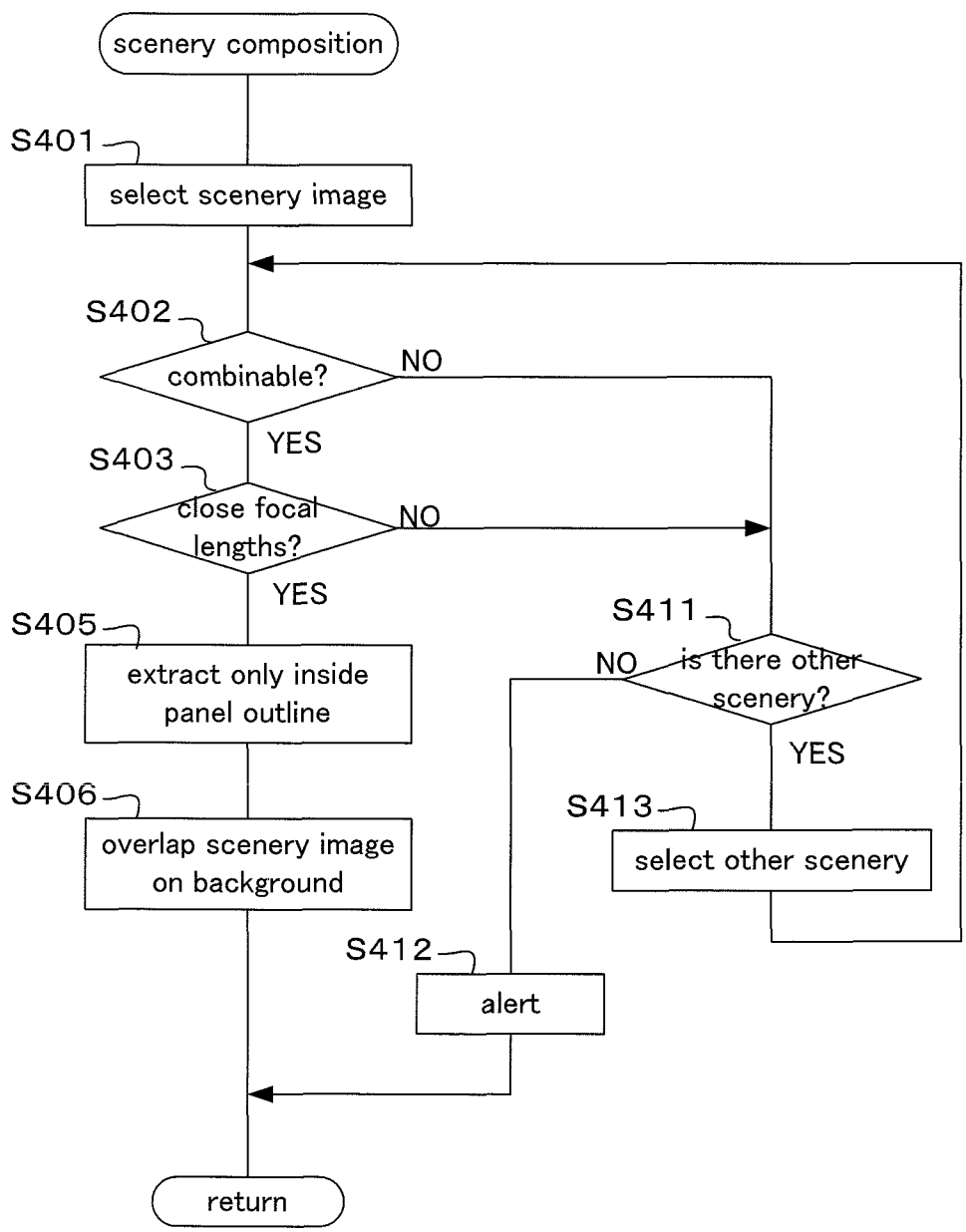
FIG. 7 is a flowchart showing scenery composition operation for the camera of the first embodiment of the present invention.

Next the scenery composition subroutine of step S116 will be described using the processing flow shown in FIG. 7. If the processing flow for scenery composition is entered, first a scenery image is selected (S401). In this step, the user selects an image from among images that have image classification in the associated information stored in association with the image data that is scenery. It is then determined whether or not the selected image is combinable (S402). Here, since information regarding whether the image is combinable or not combinable is stored within the associative information, determination is based on this information.

If the result of determination in step S402 is that the image is combinable, it is next determined whether or not the images were taken at close focal lengths (S403). It is determined whether or not the focal length information of the taken image that was subjected to image composition in step S114 is close to the focal length at the time of shooting the scenery image. At the time of this determination, focal length information stored as associative information for the shot image and the scenery image is used.

If the result of determination in step S402 is that the image is not combinable, or if the result of determination in step S403 is that the two images are not at close focal lengths, it is determined whether or not there is other scenery (S411).

Here, determination as to whether or not there is another image stored in the scenery database 7c as a scenery image is carried out.

If the result of this determination is that there is another scenery image, the next scenery image is selected (S413) and processing returns to step S402. On the other hand, if the result of determination in step S411 is that there is no more scenery, an alert indication is performed on the display section 8 (S412). It is also possible to have audio alert indication as well as visual alert indication. Once the alert indication has been performed, the original processing flow is returned to.

If the result of determination in step S403 is that the two images have close focal lengths, then from step S405 onwards a panel composite image is combined with a scenery image, to create a background composite image (refer to FIG. 3E and FIG. 3F). First, cutting out of within the panel outline is carried out (S405). Here, since outline information for the panel composite image is stored in association with the panel image 23, image data within the panel outline is extracted using this information. In this panel composite image there is an image having the face 21a of the person 21 inlaid.

Next the scenery is superimposed on the background (S406). Here the scenery image selected in step S401 is made a background image, and superimposed on the panel composite image acquired in step S405. This superimposed image is made a background composite image and displayed on the display section 8. Once display of background composite image has been displayed the original processing flow is returned to.

In this way, with the first embodiment of the present invention, first a face 21a of a person 21 is extracted, and then this extracted face is inlaid in a face part of a panel image 23 to create a panel image. On that basis, the panel image is overlaid on a background image such as a scenery image, to create a background composite image. Specifically, image composition is carried out in two stages. An outline line of the panel image 23 can be stored in advance in association with image data, and so complicated processing such as to extract the outline line of the person 21 is not necessary. Also in the case where a face 21a of a person 21 is inlaid in the panel image 23, by previously storing data for the outline line of the portion of the face 23a of the panel image 23, there is no need for complicated processing.

Next, a modified example of the first embodiment of the present invention will be described using FIG. 9. With the example of the first embodiment shown in FIG. 3C, there were cases where when the person 21 was large compared to the panel image 23 part of the body stuck out. In this type if situation also, when creating a panel composite image it is possible to eliminate the part of the body that sticks out, and so there is no significant problem. However, by eliminating part of the body there may be cases where an unnatural image results. In this modified example, therefore, the sticking out portion is made less prominent.

Figure 9B:
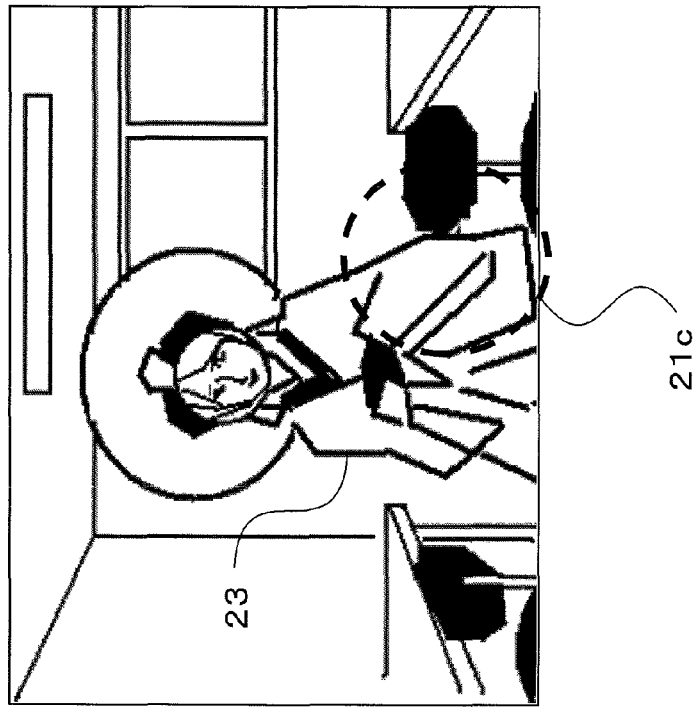
FIG. 9A and FIG. 9B are drawings for describing appearance of combining a face portion of a human image with a panel image, in a camera of a modified example of the first embodiment of the present invention.
Figure 9A:
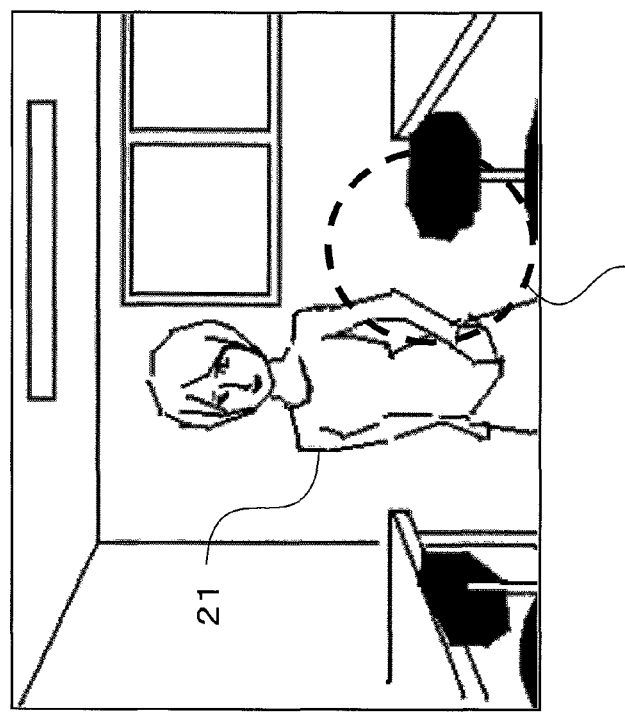

As shown in FIG. 9A, in a case where there is a sticking out portion 21c from the person 21, a panel image is selected that has a large width so as to cover the sticking out portion 21c as shown in FIG. 9B. Therefore, in the image composition playback in step S114 of FIG. 5, when searching for image panels it is better to search for image panels that are larger than the size of the person 21.

As described above, in the first embodiment and modified example of the present invention, a first combining section (S114) for combining a panel image 23 selected as a decoration image and a face image 21a, and a second combining section (S116) for further combining a background image with the composite image (panel composite image) of the first combining section, are provided. It is therefore possible to combine a person with a background image with a simple configuration.

In the first embodiment and modified example of the present invention, the camera 10 carried out image classification at the time of shooting, but it is also possible to store the minimum associative information such as focal length information at the time of shooting, and perform image classification at the time of playback or before playback.

Also, in the first embodiment and modified example of the present invention, the camera 10 executes both shooting and image composition (panel display) but it is also possible for the camera to perform shooting only, and for image composition to be carried out on an image composition and display device such as a personal computer. In this case, it is possible to store image data such as taken images, panel images and scenery images in the image composition and display device, and execute the processing flow of step S111 and onwards in the image composition and display device. It is also possible to execute the function of image classification in the image composition and display device.

Further, in the first embodiment and modified example of the present invention, besides performing combination of a panel image with a face image, a background image is selected and combined. However, it is also possible for the background image to be the unaltered shot image, without carrying out combination with a background image.

Next, a second embodiment of the present invention will be described using FIG. 10 to FIG. 13C. In the first embodiment, there are databases such as the panel database 7b and the scenery database 7c inside the camera 10, and image combination with a taken image was performed using panel images etc. stored in these databases. Specifically, all image processing was carried out inside the camera 10. By contrast, with the second embodiment the camera 10 communicates with a server 100, and image combination with panel images etc. is carried out by the server 100. Specifically, with this embodiment image composition is carried out using an external database.

Figure 10:
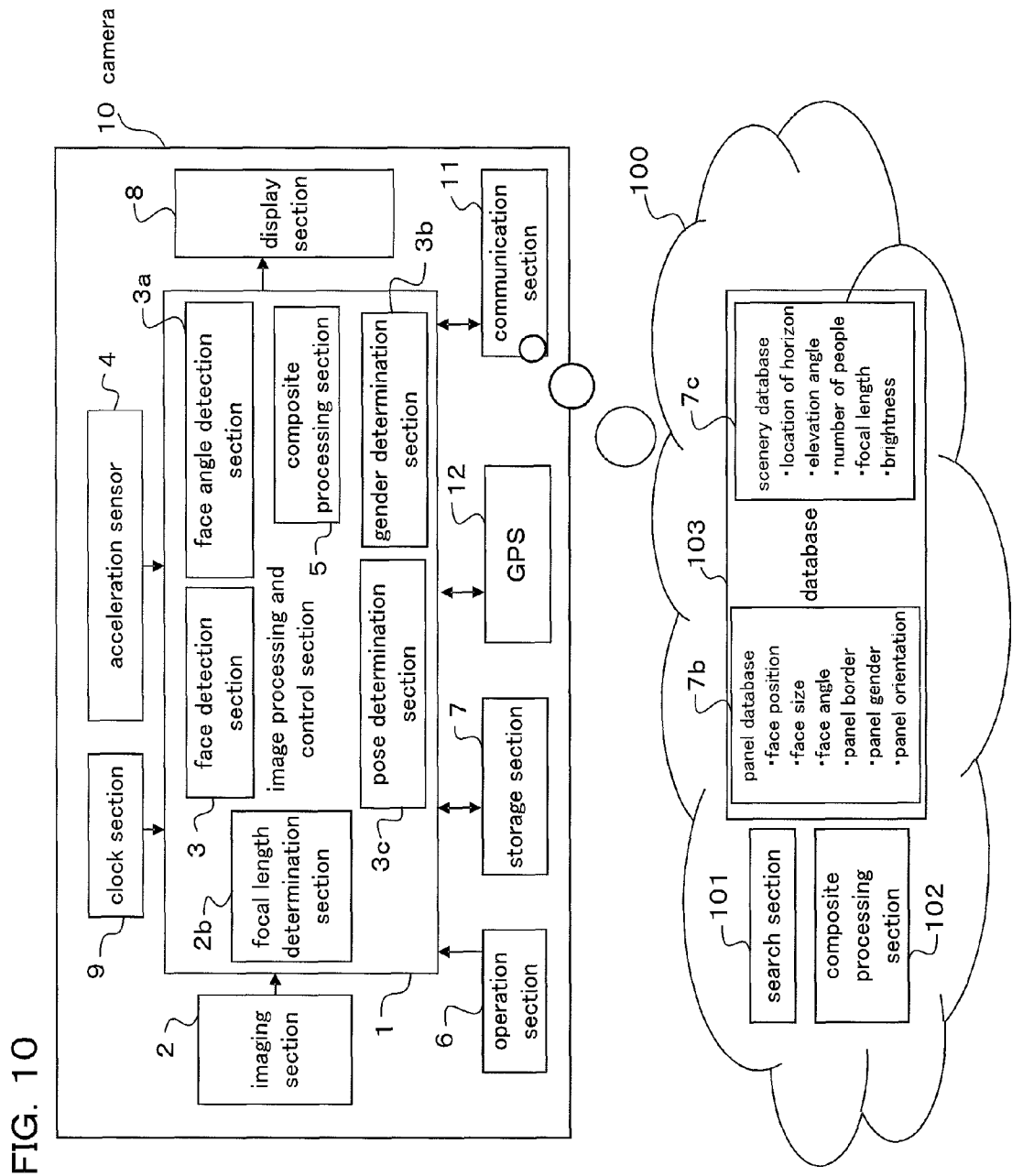
FIG. 10 is a block diagram showing electrical circuits of a system made up of a camera and a server of a second embodiment of the present invention.

FIG. 10 is a block diagram showing electrical circuits of a system made up of a camera 10 and a server 100 of a second embodiment of the present invention. Sections of the camera 10 that are the same as in the first embodiment have the same reference numerals affixed, and detailed description thereof is omitted.

In addition to the sections inside the image processing and control section 1 of the first embodiment, a gender determination section 3b and a pose determination section 3c are additionally provided in the image processing and control section 1. The gender determination section 3b detects characteristics of the taken image, such as a hairstyle or clothing of a head part of the person, and determines whether a subject is male or female based on these characteristics.

The pose determination section 3c detects characteristics of the taken image, and determines what pose the person is striking by determining what position hands having the same color as a face detected by the face detection section 3 are in, etc. It is preferable for poses to be different from plain ordinary posing, such as posing with folded arms, or with hands on waist etc., and preferably a pose where it is unlikely that any portion will stick out from a panel, and with this embodiment characteristics of a plurality of poses are stored.

A communication section 11 performs data communication with an external server 100 in a state connected to the Internet or a mobile telephone circuit. Connection to the Internet or a mobile telephone circuit can be by wired communication, but with this embodiment transmission and reception of data is carried out by wireless communication. A GPS 12 is a Global Positioning System, and current location is detected using signals from a satellite.

The server 100 is capable of communication with the camera 10 via the communication section 11, and internally has a search section 101, a composite processing section 102 and a database 103. Within the database 103 are stored the same data as in the panel database 7*b* and the scenery database 7*c* of the camera 10 of the first embodiment. However, compared to the databases 7*b* and 7*c* stored in the camera 10, the database 103 has a large capacity and the number of data items stored is significantly larger than in the camera 10.

The search section 101, as will be described later, searches for panel images from the panel database 7*b* that match the characteristics of a taken image received from the camera 10. At the time of this search, the location, size and orientation (angle) of a face is taken into consideration. The composite processing section 102 combines a searched panel image etc. with a taken image. Besides this, inside the server 100 there are a communication section for performing communication with external devices such as the camera 10, and a storage section for temporarily storing data transmitted from the camera 10 etc.

Figure 11:
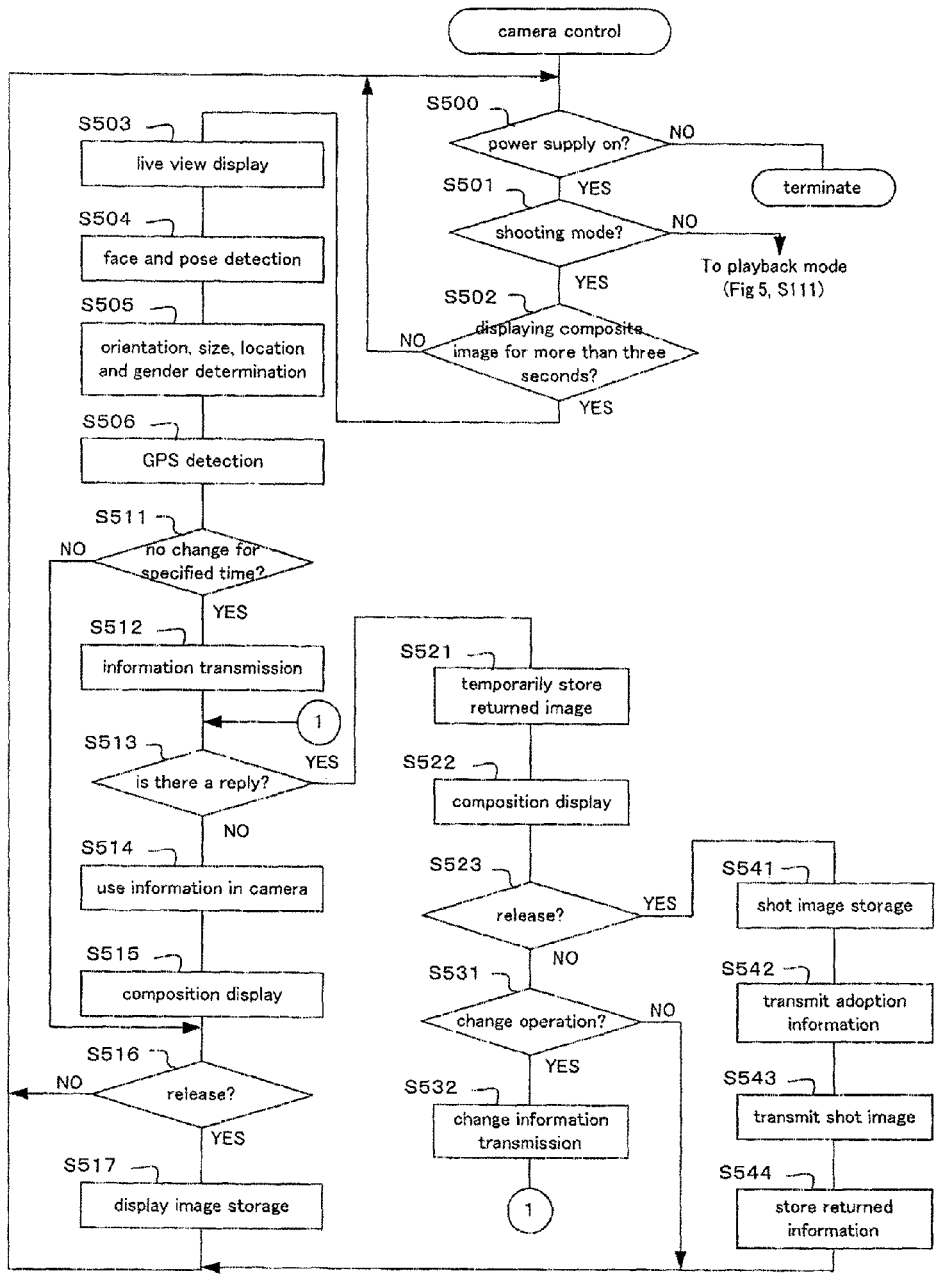
FIG. 11 is a flowchart showing camera control operations for the camera of the second embodiment of the present invention.

Next, camera control operations of the camera 10 of this embodiment will be described using the flowchart shown in FIG. 11. If the processing flow for camera control is entered, it is first determined whether or not the power supply is on (S500), similarly to step S100 (refer to FIG. 5) of the first embodiment. Here, whether or not a power switch is on is determined, and if the power switch is off the processing flow for camera control is terminated.

If the result of determination in step S500 is that the power supply is on, it is next determined whether or not the camera is in shooting mode (S501), similar to step S101. If the result of this determination is that it is not shooting mode, playback mode is executed. Playback mode is the same as from steps S111 to step S126 in the flowchart shown in FIG. 5, and so description is omitted here.

If the result of determination in step S501 is that it is shooting mode, it is next determined whether or not 3 seconds have elapsed from start of display of a composite image (S502). As will be described later, since display of a composite image is carried out in step S515 or step S522, in step S502 it is determined whether or not 3 seconds have elapsed from commencement of composite display. 3 seconds is an illustrated example, and it is totally possible for this time to be longer or shorter than 3 seconds, but during the time set here a composite image is displayed on the display section 8, and while that is taking place processing in step S503 and after is not executed.

If the result of determination in step S502 is that 3 seconds have not elapsed, processing returns to step S500. On the other hand, if the result of determination is that 3 seconds have elapsed, live view display is next carried out, the same as step S102 (S503).

If live view display is carried out, detection of faces and poses is next carried out (S504). Here the face detection section 3 determines whether or not there is a face in an image using image data acquired by the imaging section 2. Also, in the event that a face is included, the pose determination section 3*c* determines whether or not a person is striking a pose using image data. When performing this determination, it is determined whether or not there is a match or resemblance to any of features of a plurality of aspects that are stored in advance as poses.

Once face and pose detection have been carried out, the orientation, size, location and gender of the face are next determined (S505). Here, in the event that a face has been detected in step S504, the face detection section 3 determines the position and size of that dace based on image data. The face inclination angle detection section 3*a* also detects face orientation (angle) using image data. Further, the gender determination section 3*b* determines the gender of the person to whom that face belongs using image data. Then, current position of the camera is detected by the GPS 12 (S506).

Next it is determined if there has been no change in the pose of the subject for a specified time (S511). Here, it is determined whether or not there has been no change in the pose of the subject detected in step S504 for a specified time. If the same pose has been held for the specified time, information relating to the person who is the subject is transmitted, and so the specified time used in the determination is preferably a time in which it can be confirmed that a pose is actually being struck, and is preferably, for example, 2 to 3 seconds.

If the result of determination in step S511 is that there has been no change for a specified time, information is then transmitted (S512). In this step, information relating to orientation (angle), size, location and gender of the face, and characteristics of aspects of a pose, of a subject person acquired in steps S504, S505 and 5506, and information relating to current location of the camera 10, are transmitted via the communication section 11 to the server 100. There are also methods for transmitting the image data acquired by the camera 10, but since transmitting image data that changes frequently to the server 100 involves a significant communication load, in this embodiment image data is not transmitted and only information relating to the subject is transmitted, to minimize data transmission.

It is next determined whether or not there is a reply from the server 100 (S513). As will be described later using FIG. 12, if the server 100 receives information relating to a subject from the camera 10, then database search is carried out in step S611, and panel images etc. that match information such as gender, pose, face size and face angle of the person who is the subject are transmitted. In step S513 it is determined whether or not communication with the server 100 is established and there has been a reply. Images transmitted from the server 100 have data amount that is small but will cause no problem with image quality when displaying on the display section 8 of the camera 10, which means that communication load is small, and it is possible to achieve a high communication speed and a high composite processing speed.

If the result of determination in S513 is that there has been no reply, information within the camera is utilized (S514). In this case, since it has not been possible to establish communication between the camera 10 and the server 100, search for panel images etc. is carried out within the camera 10. Specifically, panel images that match the subject person are searched for from within panel images stored in the panel database 7*b*, etc. stored in the storage section 7 within the camera 10.

Once retrieval of panel images etc. has been carried out within the camera 10, the composite display is then carried out (S515). Here, combination of a taken image with a panel image etc. retrieved in step S514 is carried out, and the composite image is displayed on the display section 8.

Once composite display has been carried out, it is next determined whether or not there has been a release operation, as in step S107 (S516). Here, whether or not the release button has been operated is determined based on signals from the operation section 6. If the result of this determination is that there has been no release, processing returns to step S500.

On the other hand, if the result of determination in step S516 is that there has been a release operation, storage of a display image is carried out next (S517). Here, after image data from the imaging section 2 has been subjected to image processing by the image processing and control section 1, it is stored in a storage medium of the storage section 7. Once the display image has been stored, processing returns to step S500.

If the result of determination in step S513 is that there has been a reply from the server 100, the received images are temporarily stored (S521). If the server 100 has retrieved a panel image etc. that match characteristics of the subject person, that panel image is transmitted to the camera 10, and so in step S521 the panel image is received, and that image is temporarily stored in a temporary storage section within the camera 10.

Next, combination display is carried out (S522). Specifically, the composite processing section 5 combines a panel image received in step S521 with an image acquired by the imaging section 2, and displays this composite image on the display section 8.

Once composite display has been carried out, it is next determined whether or not there has been a release operation, as in step S516 (S523). In step S522 display of the composite image is carried out, and so if the photographer looks at that image and like it release is carried out. If release is performed, processing from step S541 onwards is carried out, and the taken image and the composite image are stored.

If the result of determination in step S523 is that release has not been performed, it is next determined whether or not a change operation has been performed (S531). The operation section 6 of this embodiment has a manual operation member for change operation. If the photographer does not like the panel image displayed in step S522 and wants to change to another panel image, the manual operation member for the change operation is operated. Therefore, in this step S531 it is determined whether or not the manual operation member for change operation has been operated.

If the result of determination in S531 is that there is no change operation, processing returns to step S500. On the other hand, if there was a change operation change information is transmitted to the server 100 (S532). Specifically, the fact that the manual operation member for change operation has been operated is notified to the server 100. Once the change information has been transmitted, processing advances to step S513.

If the result of determination in step S523 is that release has been performed, the taken image is then stored (S541). Here, after image data from the imaging section 2 has been subjected to image processing by the image processing and control section 1, image is stored in the storage section 7.

Next, adoption information is transmitted (S542). Adoption information is information such as characteristics of a subject transmitted from the server 100 for composite image display immediately before release. Once the adoption information has been transmitted, the taken image is transmitted (S543). Here, image data for the taken image stored in step S541 is transmitted to the server 100.

Once the taken image has been transmitted returned information is stored (S544). As will be described later, a final composite image is handled by the composite processing section 102 in the server 100, and this composite image is transmitted to the camera 10. In this step this composite image is received, and the received composite image is stored in the storage section 7. It is also possible, instead of receiving the composite image, to store the composite image on the server and have the photographer acquire the image by accessing the server using a personal computer or the like. In this case, an address etc. for accessing the server is stored in the storage section 7. If the returned information from the server 100 is stored, processing returns to step S500.

In this way, with the camera control processing flow of this embodiment characteristic information such as orientation (angle), size, location and gender of a face of a person who is the subject is acquired in the camera 10, and the characteristic information etc. is transmitted to the server 100. These items of information have only a small data size, and so it is possible to reduce the communication load. Also, if the server 100 has these items of information it is possible to carry out retrieval of panel images which means that it is possible to frequently communicate with the server and easily acquire panel images to cope with changes in the subject.

Also with this embodiment, when the person who is the subject of a photograph holds a specified pose for a specified time, characteristic information and the like is transmitted to the server 100. There is therefore the advantage that it is not necessary for the photographer to expressly perform operations to transmit information.

Figure 12:
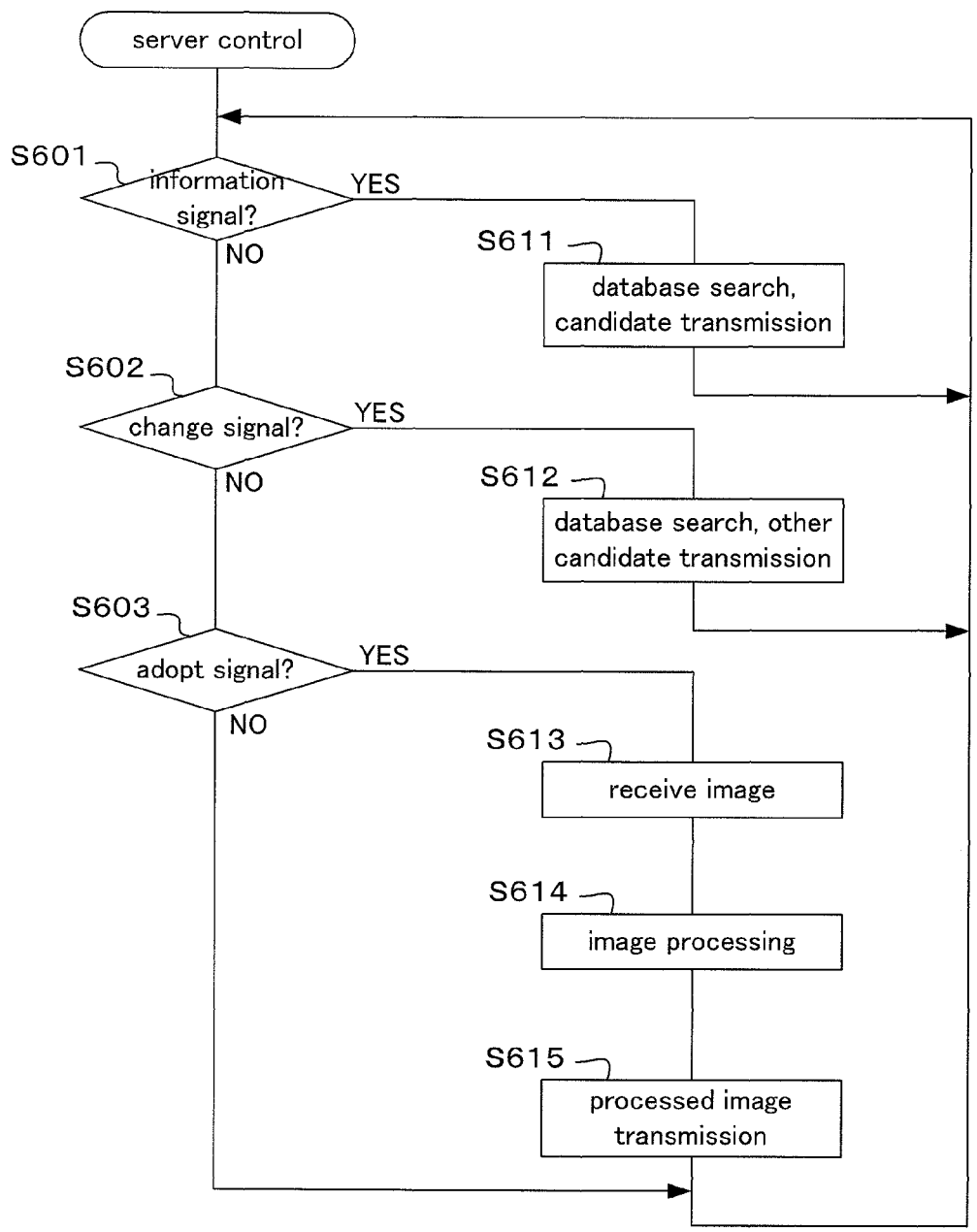
FIG. 12 is a flowchart showing server control operations for the server of the second embodiment of the present invention.

Next, operation of the server 100 of this embodiment will be described using the flowchart shown in FIG. 12. If the processing flow for server control is entered, it is first determined whether or not information signals have been received (S601). As previously described, in step S512 the camera 10 transmits information relating to a subject, such as characteristics of the subject, to the server 100, and so in this step S601 it is determined whether or not that information has been received.

Figure 13A:
FIG. 13A to FIG. 13C show a taken image and processed taken images, in the second embodiment of the present invention.

If the result of determination in step S601 is that the information signals have been acquired, database search is next carried out (S611). Here, the panel database 7b within the server 100 is searched, and matching panel images are retrieved based on the information signals. For example, in the case of an image as shown in FIG. 13A, the image of the person 21 is not itself transmitted to the server 100, but characteristic information relating to the location, size and orientation of the face of the person 21 is transmitted to the server 100. Accordingly, in step S611 the server 100 searches for a panel image 23 that matches the person 21 based on the characteristic information, and image data for that panel image 23 is transmitted to the camera 10 as a candidate.

Figure 13B:
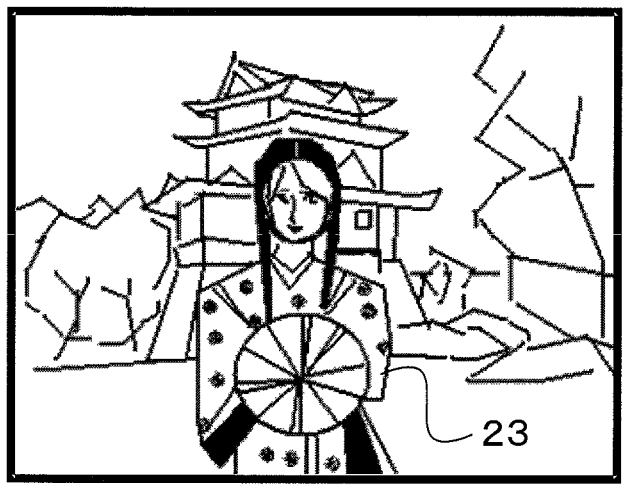

Since gender information is transmitted from the camera 10, it is possible to select a panel image of clothing appropriate to the gender of the person 21. Also, since GPS information is also transmitted from the camera 10, it is possible to select an image appropriate for the shooting location. By selecting a panel image according to the shooting location, it results in an image that is a visual annotation for that location. For example, if the shooting location is an historic place, it is possible to select a clothing panel image appropriate to that era. By putting on clothing so as to give a feeling of history, as shown in FIG. 13B, it is possible to evoke the nostalgia of notable spots of historic interest. Once database search has been carried out and results transmitted as candidates in step S611, processing returns to step S601.

If the result of determination in step S601 is that there is no information, it is next determined whether or not there is a change signal (S602). As described previously, if the camera 10 determines that there has been a change operation in step S531, change information is transmitted in step S532, and so in this step it is determined whether or not change information has been received.

If the result of determination in step S602 is that a change signal has been received, then database search is carried out, and another image is transmitted as another candidate (S612). Since the photographer is requesting transmission of a panel image other than the candidate panel image that was transmitted in step S611, in this step search for a panel image that matches the person 21 is again carried out based on characteristics information, and a retrieved panel image is transmitted to the camera 10 as another candidate. In this case, for example, in the event that there was an initial princess panel image, it is possible to next search for a panel image of a different type, such as a ghost or military commander panel image. Once transmission of another candidate has been carried out, processing returns to step S601.

If the result of determination in step S602 is that there is no change signal, it is next determined whether or not there is an adopt signal (S603). As described previously, at the time of release the camera 10 transmits adoption information when adopting as a composite image to the server 100 in step S542. In this step it is determined whether or not the adopt signal has been received.

If the result of determination in step S603 is that the adopt signal did not arrive, processing returns to step S601. On the other hand, if the result of determination is that there was an adopt signal, image receipt is then carried out (S613). As described previously, at the time of release the camera 10 transmits image data of a taken image to the server 100 in step S543. Therefore, in this step image data of the taken image is received.

Figure 13C:

Next, image processing is carried out (S614). Here, the composite processing section 102 combines a panel image with a taken image. The composite processing section 102 of the server 100 has higher performance than the composite processing section 5 of the camera 10, and so carries out image processing not for combination of simple panel images but to apply clothing that has a feeling of solidity, as shown in FIG. 13C. It is also possible to determine light direction from the taken image, and create a more realistic composite image by taking the light conditions into consideration.

Once the image processing has been carried out, the processed image is transmitted (S615). If the processed image is transmitted to the camera 10, the camera stores this processed image in the storage section 7 of the camera 10 in step S544. The server 100 returns to the processing of step S601 once the processed image has been transmitted.

It is also possible for the camera 10 to playback display this processed image on the display section 8 when the processed image has been received. In this case, it is possible to playback display the taken image that was stored in step S541 for a specified time, and then display the processed image for a specified time.

In this manner, with this embodiment the server 100 retrieves a panel image that matches a subject person based on characteristic information of that person received from the camera 10, and transmits the retrieved panel image to the camera 10 as a candidate image. The server 100 is capable of storing a large capacity database, which means that it is possible to easily retrieve a panel image that matches the person based on various information, such as characteristic information or GPS information etc.

With this embodiment, the taken image itself is not transmitted to the server 100, and instead characteristic data about the face of the person who is the subject, etc., is transmitted. This is in order to reduce load during communication, but if communication capacity is large and high speed it is possible to transmit the taken image as is to the server 100, and to perform determination on the characteristic information, that was carried out in steps S504 and S505, on the server 100.

Also with this embodiment, current location of the camera 10 was detected using the GPS 12. However, other methods of detecting location of the camera 10 can also be adopted beside using GPS, such as detecting position from a connection point of a mobile telephone or the like.

Figure 14A:
FIG. 14A to FIG. 14C show a taken image and processed taken images, in a modified example of the second embodiment of the present invention.
Figure 14B:
Figure 14C:

Next, a modified example of an image returned from the server 100 of this embodiment in step S544 will be described using FIG. 14A-FIG. 14C. The returned image is a still image in the second embodiment, but as shown in FIG. 14A it is also possible to return image data of a movie, such that it is possible to display the appearance of changes on the actual taken image.

It is also possible to have image data of a movie such as changes in background. For example, as shown in FIG. 14B it is possible to have image data of a movie where a mounted knight 22a passes across the background. Also, since orientation of the face of the subject person is determined and face orientation information is also transmitted to the server 100 as characteristic information, it is also possible to create a background image that accords with the face orientation. For example, as shown in FIG. 14C, it is possible to arrange a warrior so as to be facing the person 21.

Next, a modified example of the composite display in step S522 of FIG. 11 will be described using FIG. 15A to FIG. 15D. In FIG. 11, a composite image was displayed having a panel image 23 simply overlaid on the subject person 21. However, by simply overlaying, there may be situations where a part of the person 21 sticks out beyond the panel image. In this modified example, therefore, the sticking out portion is also covered up by the panel image.

Figure 15A:
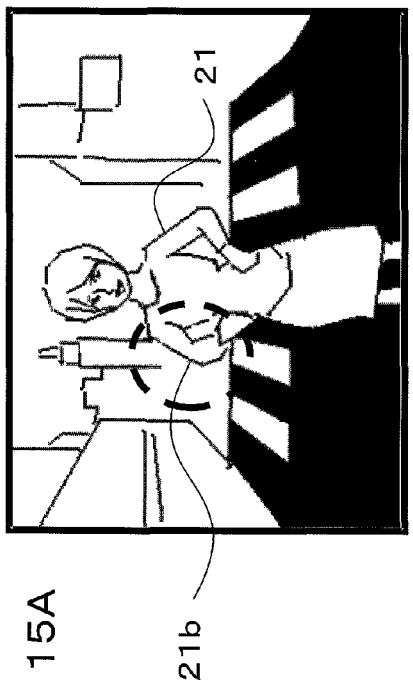
FIG. 15A to FIG. 15D show a creation process for a composite image, in a modified example of the second embodiment of the present invention.
Figure 15B:
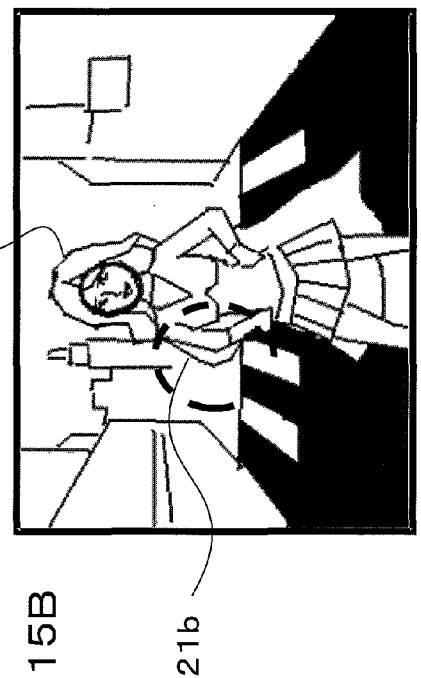

FIG. 15A shows the appearance of a person 21 posing with their hands on their hips. In this state, if a panel image 23a based on outline information of the panel image 23 is overlaid, then as shown in FIG. 15B there may be cases where an arm portion 21b of the person 21 sticks out from the panel image 23.

Figure 15C:
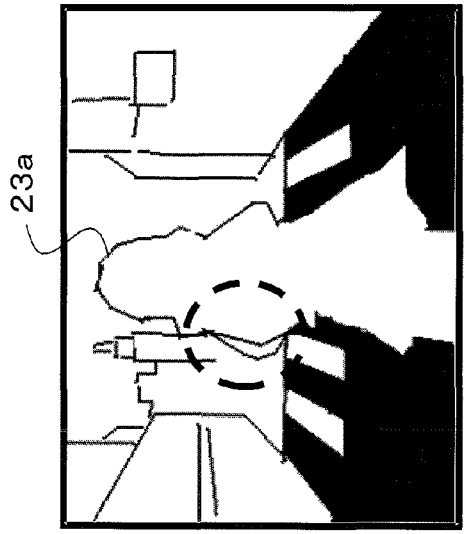
Figure 15D:
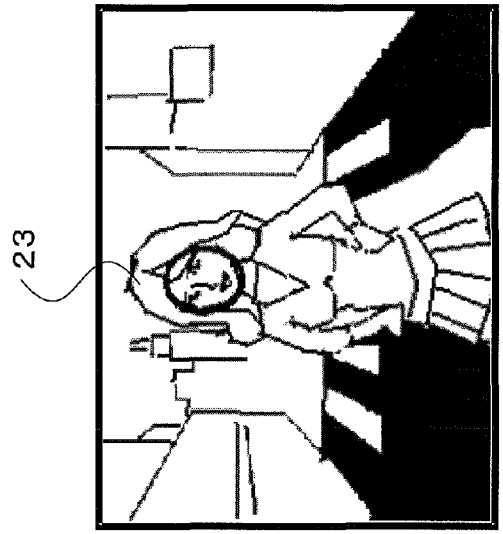

Therefore, in each of the embodiments of the present invention, since it is possible to perform image processing by dividing into inside and outside of the panel image 23 based on outline information 23a of the panel image 23, the panel image that falls outside of the outline information 23a is cut away, as shown in FIG. 15C, and the image at the inside of the outline is expanded. If the two are combined, it is possible to acquire a composite image in which the sticking out portion is covered up, as shown in FIG. 15D. This enlargement factor can be determined by detecting the extent to which there is sticking out from the outline of the subject, but if constraints such as the subject holding a specified pose are taken into consideration limbs will not stick out by more than double the width of the panel, and so it can be uniformly set to between about 1.2 to 1.5 times.

In this manner, with this modified example it is possible to perform processing by separating a background and the main subject using outline information when overlaying a panel image. It is therefore possible to cover with the panel image even for various poses of the main subject. Also, since the panel image is divided into outside the outline and inside the outline, and processing only carried out to expand and redraw the inner part on the background, it is possible to speedup the processing, and it is also possible to display using live view display.

As has been described above, in each of the embodiments and modified examples of the present invention, image composition in which clothing etc. is appropriately changed with a face portion of a person in a taken image kept as it is, can be carried out based on information such as location, size and orientation of the face.

With each of the embodiments and modified examples of the present invention, search for panel images is carried out using various information, but not all of the information mentioned in the embodiments, for example, information such as location, size and orientation (angle) of a face, whether or not a pose is being struck, and gender information etc., is required, and it is also possible to appropriately select an image taking into consideration required brightness and constraints with the device used etc.

Also, with each of the embodiments and modified examples of the present invention description has been given taking examples of well known novelty painted display boards that can regularly be seen at Japanese tourist attractions as panel images. However, the panel images are not limited to these type of well known sights, and as long as it is possible to separate from a background and hide the outline of a person there is no need for a panel, and it is also possible, for example, to have digital data for an image pattern that can be used to decorate around a persons face, such as a soft toy, a cartoon character, a building, or scenery such as mountains etc. It is also possible to supplement or replace this type of decorative image data in the camera 10.

Further, in each of the embodiments and modified examples of the present invention, the camera communicates with the server 100 in a state connected to the Internet or a mobile phone circuit. However, this is not limiting, and it is also possible to carry out communication between the camera and a mobile phone, and to transmit panel information that has been obtained with the mobile phone communicating with the server 100 to the camera.

Still further, with each of the embodiments of the present invention, a device for taking pictures has been described using a digital camera, but as a camera it is also possible to use a digital single lens reflex camera or a compact digital camera, or a camera for movie use such as a video camera, and further to have a camera that is incorporated into a mobile phone, a mobile information terminal (PDA: Personal Digital Assistant), game console etc.

The present invention is not limited to each of the above described embodiments and modified examples, and structural elements may be modified in actual implementation within the scope of the gist of the embodiments. It is also possible to form various inventions by suitably combining the plurality structural elements disclosed in the above describe embodiments. For example, it is possible to omit some of the structural elements shown in the embodiments. It is also possible to suitably combine structural elements from different embodiments.

What is claimed is:

1. An imaging device, comprising:
an imaging section for forming a subject image and outputting image data;
a face detection section for detecting a face portion of a subject person based on the image data:
a decoration image selection section for selecting a decoration image from a plurality of decoration image data, in accordance with a face detected by the face detection section, the decoration image having a face portion of a person removed, and covering up the body of the subject person whose face was detected by the face detection section; and
a first combining section for combining the selected decoration image and the detected face portion of the subject person in the subject image, the first combining section carrying out combining to inlay the face portion of the subject person in the subject image in the removed portion.

2. The imaging device of claim 1, further comprising:
a second combining section for further combining a background image with a composite image of the first combining section.

3. The imaging device of claim 1, wherein:
the plurality of decoration image data have information on size and location of a portion corresponding to a face, enabling replacement of a portion corresponding to a face.

4. The imaging device of claim 3, wherein:
the face detection section is capable of determining angle and size of a face, in order to determine if it is possible to combine the face with a portion corresponding to the face that can be replaced by the plurality of decorative image data.

5. The imaging device of claim 1, wherein:
the decorative image data has outline information for separating into a main image inside the decorative image, and a background image outside the decorative image.

6. An imaging device, comprising:
an imaging section for forming a subject image and outputting image data;
a characteristics detection section for detecting characteristics of a subject person based on the image data and outputting characteristic information;
a communication section for transmitting characteristic information detected by the characteristics detection section to an external server, and receiving information relating to an image in which clothing has been changed by the external server, the image that has had clothing changed having a face portion of a person removed, and a body of the subject person whose characteristics were detected by the characteristics detection section, covered up; and
a storage section for storing an image in which the changed clothing is put on the subject person, based on the received information, the image that has had the changed clothing applied being generated by inlaying the face portion of the subject person in the subject image in the portion that has been removed.

* * * * *